United States Patent
Taguchi

(10) Patent No.: US 11,396,311 B2
(45) Date of Patent: Jul. 26, 2022

(54) VEHICLE CONTROL DEVICE

(71) Applicant: DENSO CORPORATION, Kariya (JP)

(72) Inventor: Kiyotaka Taguchi, Kariya (JP)

(73) Assignee: DENSO CORPORATION, Kariya (JP)

(*) Notice: Subject to any disclaimer, the term of this patent is extended or adjusted under 35 U.S.C. 154(b) by 148 days.

(21) Appl. No.: 16/862,291

(22) Filed: Apr. 29, 2020

(65) Prior Publication Data

US 2020/0255034 A1 Aug. 13, 2020

Related U.S. Application Data

(63) Continuation of application No. PCT/JP2018/039932, filed on Oct. 26, 2018.

(30) Foreign Application Priority Data

Nov. 1, 2017 (JP) .............................. JP2017-212163

(51) Int. Cl.
*B60W 60/00* (2020.01)
*B60W 30/12* (2020.01)
(Continued)

(52) U.S. Cl.
CPC ........ *B60W 60/0054* (2020.02); *B60W 30/12* (2013.01); *G06V 20/58* (2022.01); *G06V 20/588* (2022.01)

(58) Field of Classification Search
CPC .............. G05D 1/0061; G05D 1/0066; B60W 2050/0095; B60W 60/005; B60W 50/082; B60W 60/0059
See application file for complete search history.

(56) References Cited

U.S. PATENT DOCUMENTS

2016/0041553 A1 2/2016 Sato et al.
2016/0121907 A1* 5/2016 Otake ................... B60W 10/18
701/23
(Continued)

FOREIGN PATENT DOCUMENTS

JP H1076964 A 3/1998
JP H10309961 A 11/1998
(Continued)

*Primary Examiner* — Kenneth J Malkowski
(74) *Attorney, Agent, or Firm* — Harness, Dickey & Pierce, P.L.C.

(57) ABSTRACT

A vehicle control device mounted to a vehicle and configured to control a traveling state of the vehicle is provided. The vehicle control device sets control contents for functions for automated driving of the vehicle, respectively, and to control the vehicle according to the control contents. The functions are each associated with one or more items of vehicle vicinity information in advance. The vehicle control device determines, for each of the functions, whether it is possible to recognize the associated one or more items of the vehicle vicinity information. The vehicle control device maintains the automated driving that uses a function associated with one or more items of the vehicle vicinity information recognized by the recognition determination unit, and switches over, into manual driving, the automated driving that uses a function associated with one or more items of the vehicle vicinity information not recognized by the recognition determination unit.

10 Claims, 16 Drawing Sheets

(51) Int. Cl.
*G06V 20/58* (2022.01)
*G06V 20/56* (2022.01)

(56) References Cited

U.S. PATENT DOCUMENTS

| | | | |
|---|---|---|---|
| 2017/0270798 A1 | 9/2017 | Ushiba et al. | |
| 2018/0059661 A1* | 3/2018 | Sato | B60W 40/04 |
| 2019/0001994 A1 | 1/2019 | Isaji et al. | |
| 2019/0283769 A1 | 9/2019 | Chiba et al. | |

FOREIGN PATENT DOCUMENTS

| | | |
|---|---|---|
| JP | 2016030513 A | 3/2016 |
| JP | 2016038768 A | 3/2016 |
| JP | 2016215676 A | 12/2016 |
| JP | 2017-128180 A | 7/2017 |
| JP | 2017119505 A | 7/2017 |
| JP | 2017165296 A | 9/2017 |
| JP | 2018090218 A | 6/2018 |

\* cited by examiner

VEHICLE CONTROL DEVICE

CROSS-REFERENCE OF RELATED APPLICATIONS

This application is a continuation application of PCT/JP2018/039932 filed on Oct. 26, 2018, which designated the U.S. and claims the benefit of priority from Japanese Patent Application No. 2017-212163 filed on Nov. 1, 2017. The entire disclosures of all of the above applications are incorporated herein by reference.

TECHNICAL FIELD

The present disclosure relates to a vehicle control device configured to control a traveling state of a vehicle.

BACKGROUND

There is a proposed technology that, in response to an occurrence of an automated driving stop event during automated driving of a vehicle, switches a plurality of functions of the automated driving to manual driving at different timings.

SUMMARY

The present disclosure provides a vehicle control device configured to control a traveling state of a vehicle. The vehicle control device sets control contents for a plurality of functions for automated driving of the vehicle, and controls the vehicle according to the control contents. The plurality of functions are each associated with one or more items of vehicle vicinity information in advance. The vehicle control device determines, for each of the functions, whether it is possible to recognize the associated one or more items of vehicle vicinity information. The vehicle control device maintains the automated driving that uses a function that is associated with the recognized one or more items of the vehicle vicinity information, and switches over, into manual driving, the automated driving that uses a function that is associated with one or more items of the vehicle vicinity information failing to be recognized.

BRIEF DESCRIPTION OF THE DRAWINGS

FIG. 6 is a timing chart illustrating a case where automated driving is switched over to partially automated driving or the like.

DETAILED DESCRIPTION

There is a proposed technology that, in response to an occurrence of an automated driving stop event during automated driving of a vehicle, switches a plurality of functions of the automated driving to manual driving at different timings.

However, from detailed studies made by the inventor, it is found out that because the proposed technology stops the automated driving in response to an occurrence of any event for stopping the automated driving, there is a difficulty in continuing the automated driving.

In one aspect of the present disclosure, there is provided a technology for maintaining automated driving as much as possible in a vehicle control device configured to control a traveling state of a vehicle.

A vehicle control device according to an aspect of the present disclosure includes a driving control unit, a recognition determination unit, and a to-manual switchover unit.

The driving control unit is configured to set control contents for a plurality of functions for automated driving of the vehicle, respectively, and to control the vehicle according to the control contents. The plurality of functions are each associated with one or more items of vehicle vicinity information in advance. The recognition determination unit is configured to determine, for each of the plurality of functions, whether it is possible to recognize the associated one or more items of the vehicle vicinity information.

The to-manual switchover unit is configured to cause the driving control unit to: (i) maintain the automated driving that uses a function that is associated with one or more items of the vehicle vicinity information recognized by the recognition determination unit among the plurality of functions; and (ii) switch over, into manual driving, the automated driving that uses a function that is associated with one or more items of the vehicle vicinity information failing to be recognized by the recognition determination unit among the plurality of functions.

With this configuration, the plurality of functions for automated driving are each associated with one or more items of vehicle vicinity information. It is possible that only a function of the automated driving associated with the unrecognizable item of vehicle vicinity information is switched over to the manual driving, and therefore, it is possible to maintain the automated driving function as much as possible.

1. Embodiment

(1-1. Constitution)

Figure 1:
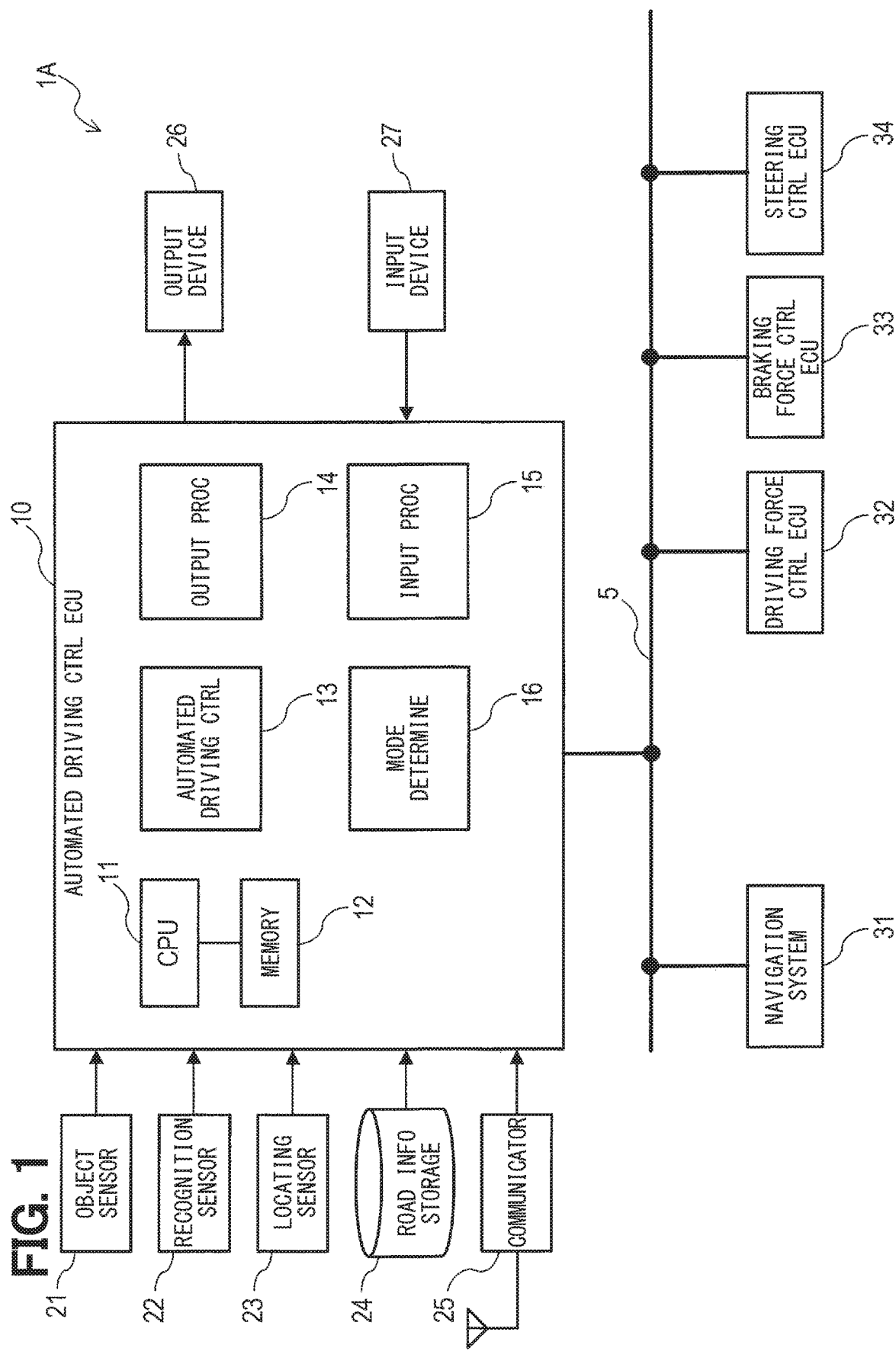
FIG. 1 is a block diagram illustrating a configuration of an automated driving system.

The automated driving system 1A shown in FIG. 1 is mounted to a vehicle such as a passenger car for example, and has a function of automated driving of this vehicle. A vehicle equipped with the automated driving system 1A is referred to as a mounted vehicle and also as a subject vehicle. The automated driving system 1A includes an automated driving control ECU (Electronic Control Unit) 10, a vicinity object sensor 21, a vicinity recognition camera 22, a vehicle positioning sensor 23, a road information storage 24, a communicator 25, an output device 26, and an input device 27, a navigation system 31, a driving force control ECU 32, a braking force control ECU 33, and a steering control ECU 34. The automated driving control ECU 10, the driving force control ECU 32, the braking force control ECU 33, the steering control ECU 34, and the navigation system 31 are connected communicably to each other via an in-vehicle network 5.

The vicinity object sensor 21 is a known sensor that detects a vehicle vicinity situation for automated driving control. In the present embodiment, the vicinity object sensor 21 detects presences, locations, sizes, distances and the like of nearby traveling vehicles and obstacles. The nearby traveling vehicles may include a preceding vehicle, an adjacent lane traveling vehicle, an oncoming vehicle, an approaching vehicle and the like. The obstacles may include a stopped vehicle, a falling object, a stationary object, and a pedestrian and the like, which hinder the traveling. Specifically, the vicinity object sensor 21 corresponds to a laser radar sensor, a millimeter wave sensor, an ultrasonic sensor, or the like.

The vicinity recognition camera 22 captures an image by imaging an area in the vicinity of the vehicle. From the captured image, the vicinity recognition camera 22 detects presences and positions of left and right white lines of the traveling lane.

The vehicle positioning sensor 23 is a sensor for detecting the current position of the subject vehicle, and specifically corresponds to a global positioning system (GPS), a gyro sensor, or the like. The automated driving control ECU 10 detects the precise and accurate position of the subject vehicle including which lane the vehicle is traveling, based on the positioning signal, the white line positions, the road information read from the road information storage 24, and the like.

The road information storage 24 stores detailed road information and the like regarding a road on which the subject vehicle is scheduled to travel. The road information includes, for example, the number of lanes, lane width, center coordinates of each lane, curvature, lane number, white line width, stop line position, traffic light position, and the like. The lane represents a travel area of the vehicle defined by a white line, a curb, and the like.

The communicator 25 is configured as a known communication module that communicates with the outside of the subject vehicle. The communicator 25 communicates with a predetermined server external to the subject vehicle, and is used to acquire a variety of information relating to traffic and weather.

Figure 2:
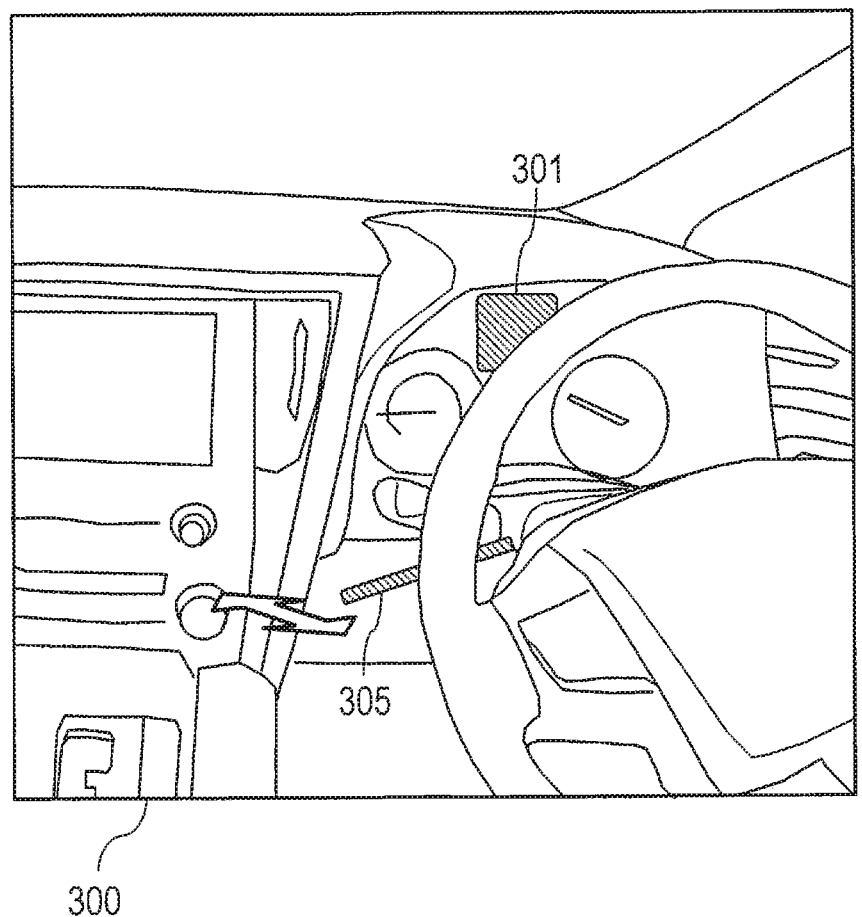
FIG. 2 is a diagram illustrating installation positions of an output device and an input device.

The output device 26 corresponds to a display device such as a known display. The output device 26 includes, for example, a display unit 301 as illustrated in FIG. 2. The display unit 301 is arranged to a meter portion located in front of a driver's seat 300 of the subject vehicle, and is configured as, for example, a liquid crystal display.

The input device 27 is a switch to be operated by the driver. The input device 27 corresponds to a steering wheel, an accelerator pedal, and a brake pedal, which are well known. Further, a switch lever 305 shown in FIG. 2 may be included in the input device 27. The switch lever 305 is a three-way momentary switch that moves forward and backward from a neutral state, and is used to receive driver's intentions to start and release the automated driving.

The driving force control ECU 32 is an electronic control unit that controls a driving actuator which generates a driving force for the vehicle, such as an engine and a motor. When the driver performs manual driving, the driving force control ECU 32 controls the driving actuator according to an amount of the driver's operation of the accelerator pedal, thereby generating a desired driving force. When the automated driving is performed, a required driving force calculated by the automated driving control ECU 10 is transmitted to the driving force control ECU 32 via the in-vehicle network 5, and the driving force control ECU 32 controls the driving actuator to realize the required driving force.

Note that the manual driving represents a state in which the control contents of the vehicle are set by the driver's operation regardless of the control contents of an automated driving control unit 13. The automated driving represents a state in which the control contents provided by the automated driving control unit 13 control the vehicle regardless of the driver's operation.

The braking force control ECU 33 is an electronic control unit that controls a brake actuator which generates a braking force for the vehicle. When the driver performs manual driving, the braking force control ECU 33 controls the brake actuator according to an amount of the driver's operation of the brake pedal, thereby generating a desired braking force. When the automated driving is performed, a required braking force calculated by the automated driving control ECU 10 is transmitted to the braking force control ECU 33 via the in-vehicle network 5, and the braking force control ECU 33 controls the actuator to realize the received required braking force.

The steering control ECU 34 is an electronic control unit that controls a motor that generates a steering torque of the vehicle. When the driver performs manual driving, the steering control ECU 34 controls the motor according to the driver's operation of the steering wheel to generate assist torque for the steering operation, and thereby realizing such steering that the driver can operate the steering with a small amount of force. When the automated driving is performed, a required steering angle calculated by the automated driving control ECU 10 is transmitted to the steering control ECU 34 via the in-vehicle network 5. The steering control ECU 34 controls the motor to generate the above-described assist torque and performs steering to realize the received required steering angle.

When a destination is set by the driver, the navigation system 31 presents a route from the current position to the destination on a map, and provides a driving advance-announcement to enable the travel following this route information in form of voices and screens such as display. The driving advance-announcement includes, for example, a process of presenting to the driver a proposal to make a right turn or a left turn at a next intersection.

The route information is transmitted to the automated driving control ECU 10 via the in-vehicle network 5, and the automated driving control ECU 10 controls the subject vehicle to travel according to the route information.

The automated driving control ECU 10 includes a microcomputer with a CPU 11 and a semiconductor memory (hereinafter, memory 12) such as a RAM and a ROM. Each of functions of the automated driving control ECU 10 is implemented by the CPU 11 executing a program stored in a non-transitory tangible storage medium. In this example, the memory 12 corresponds to a non-transitory tangible storage medium storing a program. When this program is executed, a method corresponding to the program is executed. The non-transitory tangible storage medium is intended to exclude electromagnetic waves. Further, the automated driving control ECU 10 may include one or more microcomputers.

As shown in FIG. 1, the automated driving control ECU 10 includes an automated driving control unit 13, an output processing unit 14, an input processing unit 15, and a mode determination unit 16 as functions performed by the automated driving control ECU 10. Technologies for implementing functions of each unit included in the automated driving control ECU 10 are not limited to software. Some or all of the functions may be implemented using one or a plurality of hardware. For example, when the functions described above may be implemented by an electronic circuit that is hardware, the electronic circuit may be implemented by a digital circuit, an analog circuit, or a combination thereof.

The automated driving control unit 13 implements functions of automatedly driving the vehicle toward the destination. Specifically, the automated driving control unit 13 acquires information obtained using the vicinity object sensor 21, the vicinity recognition camera 22, the vehicle positioning sensor 23, the road information storage 24, the communicator 25, the navigation system 31, and the like, and acquires vehicle information and the like obtained from another ECU via the in-vehicle network 5. In order for the vehicle to travel toward the destination, the automated driving control unit 13 calculates a route ahead of several meters to several hundreds meters and calculates a target vehicle movement for traveling along the route, and calculates a target driving force, a target braking force, and a target steering angle for realizing the target vehicle movement.

Further, the automated driving control unit 13 sends the calculated target driving force, target braking force, and target steering angle as the required values to the driving force control ECU 32, the braking force control ECU 33, and the steering control ECU 34 via the in-vehicle network 5, respectively. The driving force control ECU 32, the braking force control ECU 33, and the steering control ECU 34 perform control to realize the respective required values received, and implement the target vehicle movement calculated by the automated driving control unit 13. That is, the automated driving control unit 13 controls the vehicle to automatedly travel toward the destination.

In the above, the automated driving control unit 13 performs a computing operation on the control content for each of a plurality of functions, wherein the functions are for performing the automated driving. The functions for performing automated driving represent, for example, a function of accelerating the subject vehicle and a function of decelerating the subject vehicle, a function of steering the subject vehicle and the like, respectively. When all of these functions are in operation, the subject vehicle is in automated driving that does not require the driver's operation. When at least one of the functions is not in operation, the subject vehicle is in partially automated driving or manual driving. The partially automated driving represents a state in which the driver's operation is required at least partially. Specifically, the partially automated driving is a state in which the functions for performing automated driving are in part not in operation. In the present embodiment, this represents a state in which the automated driving function relating to the acceleration, the deceleration, or the steering is not in operation.

The output processing unit 14 causes the display unit 301 to perform display regarding recognition contents of the preceding vehicle, the nearby vehicle, the white line, and the like detected using the sensors, and regarding the function for the automated driving that is performable by the automated driving control unit 13.

Figure 3:
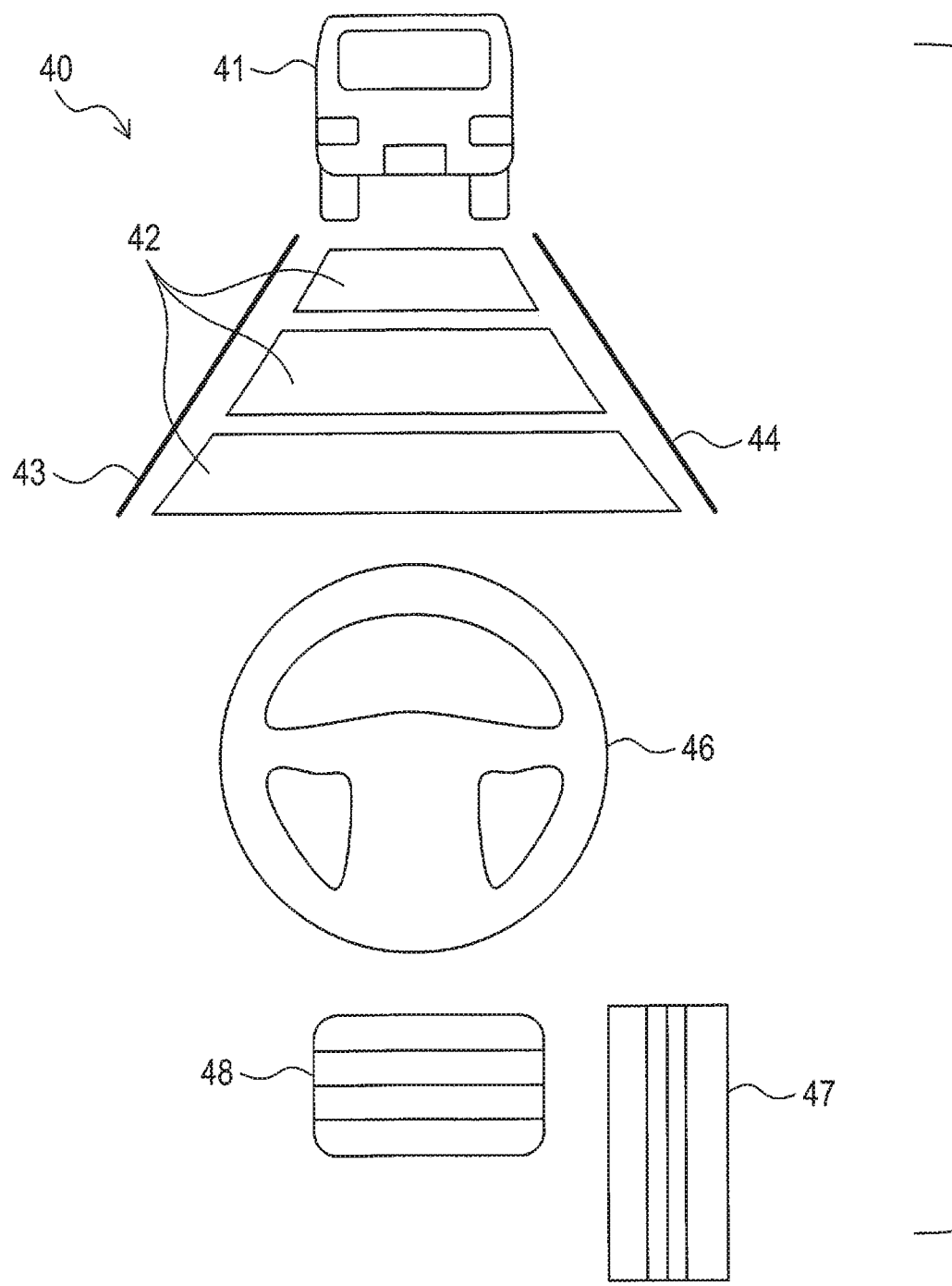
FIG. 3 is a diagram illustrating a status image.

Specifically, for example, a status image 40 may be displayed as shown in FIG. 3. The status image 40 displays the recognition contents and the performable assist status displays. The recognition contents include a preceding vehicle illustration 41, a vehicle-to-vehicle illustration 42, a left white line illustration 43, and a right white line illustration 44. The performable assist status displays include a steering illustration 46, an accelerator pedal illustration 47, and a brake pedal illustration 48.

The preceding vehicle illustration 41 is an image that lights up or blinks when a preceding vehicle traveling immediately ahead of the subject vehicle among the other vehicles is detected. The vehicle-to-vehicle illustration 42 is an image that lights up or blinks when the vehicle-to-vehicle distance is recognized in cases when a preceding vehicle is present, and that lights up or blinks when a road surface position is recognized when in cases where the preceding vehicle is absent.

The left white line illustration 43 is an image that lights up or blinks when a white line located on the left side of the subject vehicle is successfully recognized among white lines serving as lane boundaries. The right white line illustration 44 is an image that lights up or blinks when a white line located on the right side of the subject vehicle is successfully recognized among white lines serving as lane boundaries.

The steering illustration 46 is an image that lights up or blinks when the automated driving concerning the steering is going to be in operation or when the automated driving concerning the steering is in operation. The accelerator pedal illustration 47 is an image that lights up or blinks when the automated driving concerning the acceleration is going to be in operation or when the automated driving concerning the acceleration is in operation. The brake pedal illustration 48 is an image that lights up or blinks when the automated driving concerning the deceleration is going to be in operation or when the automated driving concerning the deceleration is in operation.

Figure 4:
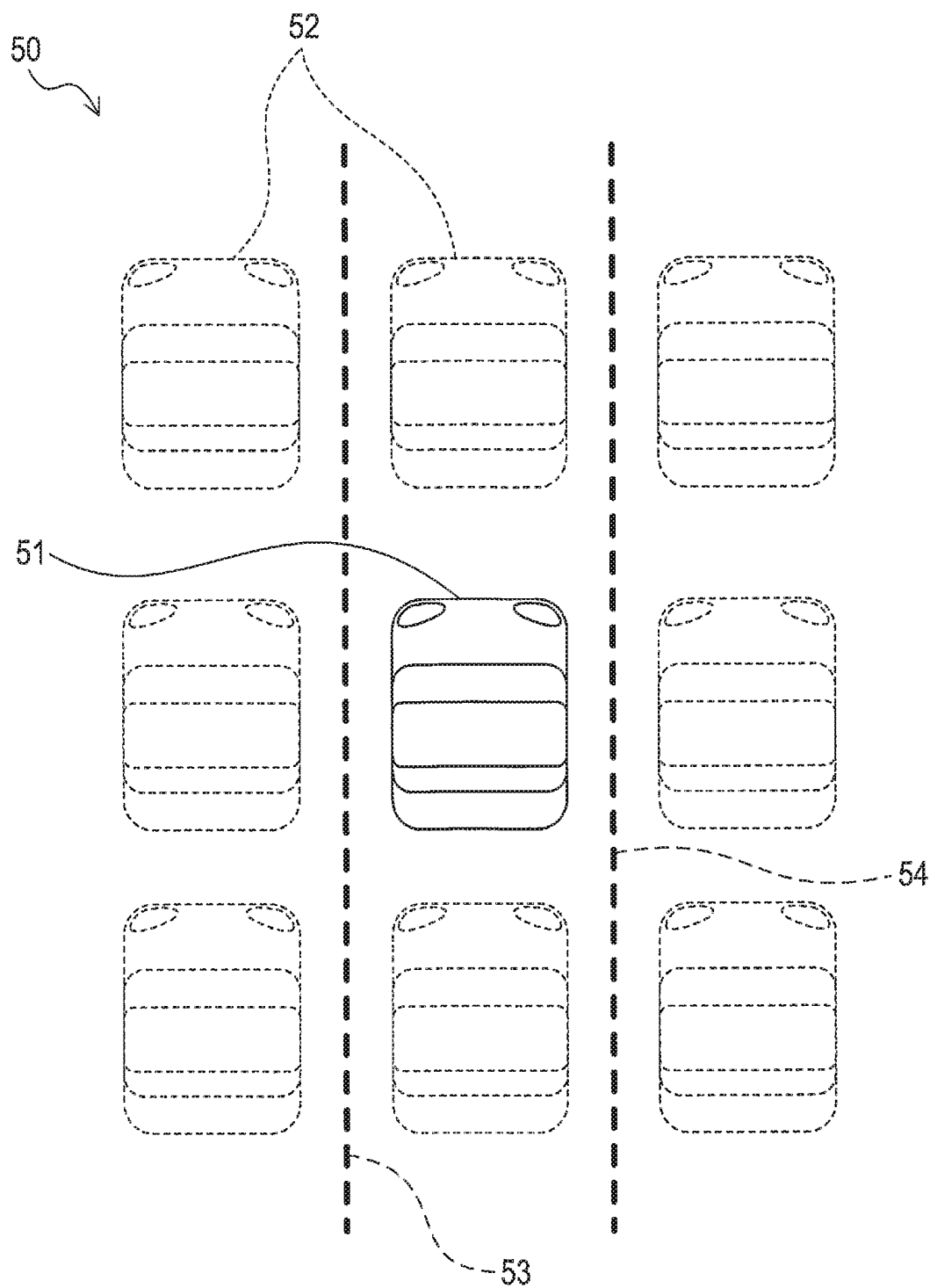
FIG. 4 is a diagram illustrating a vicinity detection image.

In the present embodiment, displaying refers to lighting up and blinking, and non-displaying refers to lighting off. Further, as shown in FIG. 4, a vicinity detection image 50 may displayed together with the status image 40 or in place of the status image 40.

The vicinity detection image 50 includes, at the center thereof, a subject vehicle illustration 51 representing the subject vehicle, and further includes recognition contents including a vehicle illustration 52 representing another vehicle in the vicinity of the subject vehicle, a left white line illustration 53, and a right white line illustration 54. These illustrations 52, 53, and 54 light up or blink when another vehicle, the left white line, and the right white line are recognized, respectively.

The input processing unit 15 reads a result of the driver's operation of the input device 27, transfers the result to the automated driving control unit 13. The automated driving control unit 13 reflects this input to the automated driving control.

The mode determination unit 16 performs automated driving mode determination processing described below. For the mode determination unit 16 to perform the automated driving mode determining processing, one or more items of vehicle vicinity information is associated in advance with a respective one of the plurality of functions for automated driving. That is, a relationship between a function for performing automated driving and an item of vehicle vicinity information is stored in the memory 12. The vehicle vicinity information represents information indicating a situation in the vicinity of the vehicle, including, for example, detection results of various sensors, statuses of recognition of other vehicles, white lines, lanes, and the like by image processing, weather, and the like. More specifically, the vehicle vicinity information may include the presences or absences and positions of a falling object, a nearby vehicle, a curb, a median strip, and the like, and may include lane information such as the number of lanes and lane width.

(1-2. Processing)

Next, the automated driving mode determination processing executed by the automated driving control ECU 10 will be described with reference to the flowcharts of FIGS. 5A and 5B. The automated driving mode determination processing is started, for example, in response to inputting instructions to perform automated driving in the subject vehicle.

First, in S110, the automated driving control ECU 10 acquires sensor information. In this process, the automated driving control ECU 10 uses the function of the input processing unit 15 and acquires, as the sensor information, information obtained from the vicinity object sensor 21, the vicinity recognition camera 22, the vehicle positioning sensor 23, the road information storage 24, the communicator 25, and the in-vehicle network 5.

In S120, the automated driving control ECU 10 generates recognition information. The recognition information indicates the presence/absence and position of a respective object obtained based on the sensor information. Specifically, the recognition information indicates the presence/absence of another vehicle and the vehicle-to-vehicle distance to another vehicle, the presence/absence and position of a white line serving as a lane boundary, etc.

In S130, the automated driving control ECU 10 determines a vehicle control manner. Using the function of the mode determination unit 16, the automated driving control ECU 10 first determines, for each of the plurality of functions for performing the automated driving, whether it is possible to recognize one or more items of the vehicle vicinity information.

Specifically, the automated driving control ECU 10 determines whether at least a lane in which the vehicle travels is recognizable as one or more items of the vehicle vicinity information associated with the function of steering the vehicle. At this time, the automated driving control ECU 10 determines whether the white line in the left side of the subject vehicle is recognizable and it is determined whether the white line in the right side of the subject vehicle is recognizable.

Further, the automated driving control ECU 10 determines whether at least an obstacle located in the vicinity of the vehicle is recognizable as one or more items of the vehicle vicinity information associated with the function of accelerating and decelerating the vehicle. In this process, for example, when the reflected wave from the road surface cannot obtained by the vicinity object sensor 21, or when the image itself cannot be obtained from the vicinity recognition camera 22, the automated driving control ECU 10 determines that it is not possible to recognize an obstacle.

In S140, the automated driving control ECU 10 determines a performable-assistance. Specifically, the automated driving control ECU 10 causes the automated driving control unit 13 to maintain a function associated with the item(s) of the vehicle vicinity information recognized in S130 among the plurality of functions, and causes the automated driving control unit 13 to make setting so that a function associated with the item(s) of the vehicle vicinity information failing to be recognized in S130 is switched over from the automated driving to the manual driving. This setting is stored in the memory 12 so that the setting is reflected in the control at the time of processing such as S430 described below. Herein, the function associated with the item(s) of the vehicle vicinity information recognized in S130 may be called the performable-assistance or doable-assist of the automated driving, and the function associated with the item(s) of the vehicle vicinity information failing to be recognized in S130 may be called an unperformable-assistance or undoable-assist of the automated driving. This setting is stored in the memory 12 so that the setting is reflected in the control at the time of processing such as S430 described below.

More specifically, when it is not possible to recognize the lane in which the subject vehicle travels, the automated driving control ECU 10 make setting to switch over the function of steering the subject vehicle from the automated driving to the manual driving. Further, when it is not possible to recognize an obstacle located in the vicinity of the subject vehicle, the automated driving control ECU 10 makes setting to switch over the function of accelerating and decelerating the subject vehicle from the automated driving to the manual driving. If both of the left and right white lines have been recognized successfully, it may be determined that the lane has been recognized successfully. Alternatively, if one of the left and right white lines has been recognized successfully, it may be determined that the lane has been recognized successfully.

In S150, the automated driving control ECU 10 performs a performable-assistance status display, which is display that corresponds to the performable-assistance. Using the function of the output processing unit 14, the automated driving control ECU 10 performs a notification about the function of which the automated driving is performable and about the recognized vehicle vicinity information.

More specifically, the automated driving control ECU 10 causes the output device 26 to light up the displays relating to the recognized vehicle vicinity information and the display relating to the performable-assistance. At this time, the automated driving control ECU 10 causes the output device 26 to light off the display relating to the unrecognized vehicle vicinity information and the display relating to the unperformable-assistance.

Further, using the function of the output processing unit 14, the automated driving control ECU 10 notifies the driver of the vehicle about the function that has returned to or is going to return to the automated driving. At this time, the automated driving control ECU 10 causes the output device 26 to blink the function that is going to return to or has returned to the automated driving, and the vehicle vicinity information that has changed from the unrecognized status to the recognized status. Display manners will be described later.

In S160, the automated driving control ECU 10 determines whether the driver's operation for releasing the automated driving has been performed. The driver's operation for releasing the automated driving corresponds to, for example, an operation of the switch lever 305, an operation of the brake pedal, and the like.

When the automated driving control ECU 10 determines in S160 that the driver's operation for releasing the automated driving has been performed, the processing proceeds to S170. In S170, the automated driving control ECU 10 sets an operation mode to a manual driving mode. The manual driving mode refers to a mode in which the automated driving and the partial automated driving are released and the manual driving by the driver is accepted.

Figure 5A:
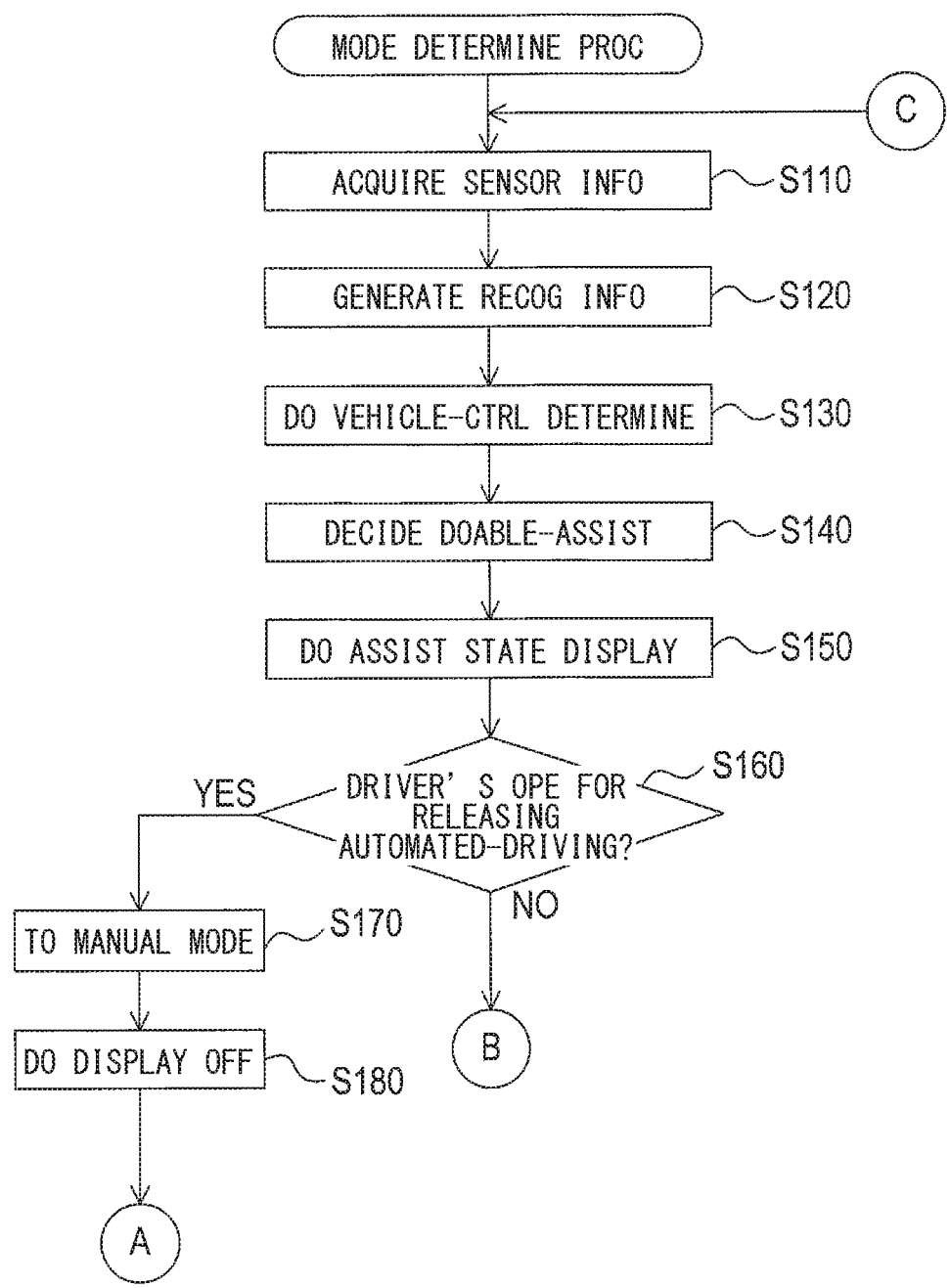
FIG. 5A is a flowchart illustrating part of automated driving mode determination processing.
Figure 5B:
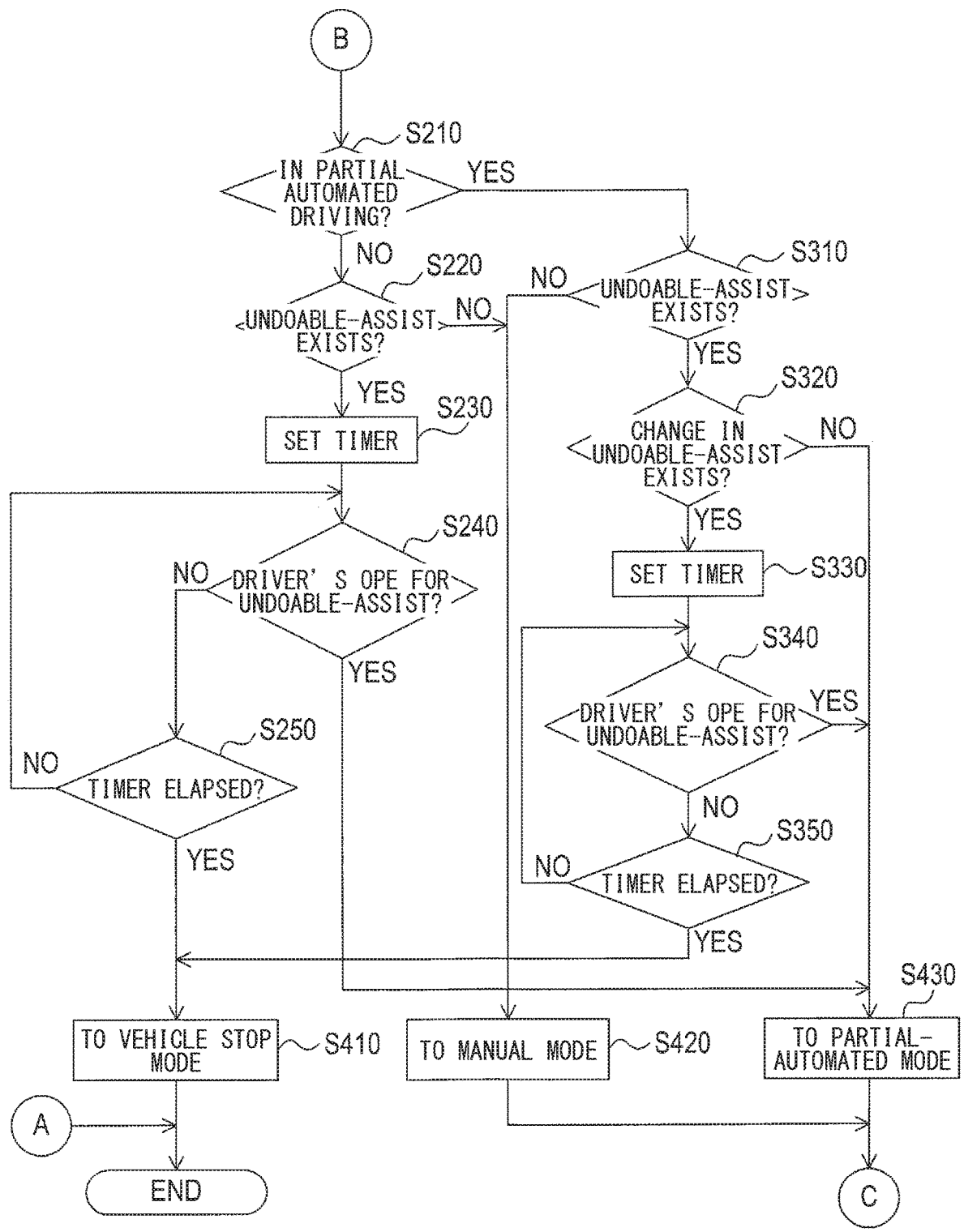
FIG. 5B is a flowchart illustrating another part of the automated driving mode determination processing.

In S180, the automated driving control ECU 10 changes display indicative of performing the automated driving display into OFF, and then ends the automated driving mode determination processing in FIGS. 5A and 5B. When the process of S180 is performed, the steering illustration 46, the accelerator pedal illustration 47, and the brake pedal illustration 48 are lighted off.

When the automated driving control ECU 10 determines in S160 that the driver's operation for releasing the automated driving has not been performed, the processing proceeds to S210. In S210, the automated driving control ECU 10 determines whether the partially automated driving is in operation.

When the automated driving control ECU 10 determines in S210 that partially automated driving is in operation, the processing proceeds to S310. When the automated driving control ECU 10 determines in S210 that partially automated driving is not in operation, the processing proceeds to S220. In S220, the automated driving control ECU 10 determines whether there is an unperformable-assistance.

When the automated driving control ECU 10 determines in S220 that there is an unperformable-assistance, the processing proceeds to S230. In S230, the automated driving control ECU 10 performs timer setting. Specifically, a timer is set to an upper limit of wait time for the driver's operation according to vehicle environment.

Specifically, depending on the environment around the subject vehicle, there are cases where the vehicle will be dangerous if the vehicle is not stopped immediately, and cases where it is safe to travel for a while. For this reason, in this process, the environment in the vicinity of the subject vehicle is recognized from the sensor information, and the upper limit time is set according to danger of the environment in the vicinity of the subject vehicle. Here, the environment in the vicinity of the subject vehicle represents at least one of weather, geographical conditions, and a distance to another vehicle.

In one example, the automated driving control ECU 10 sets the upper limit time according to the curvature of the road and the vehicle-to-vehicle distance. In other words, as the curvature of the road is larger and the curve is steeper, and as the vehicle-to-vehicle distance is smaller, the upper limit time is set smaller assuming that it corresponds to the higher danger.

In S240, the automated driving control ECU 10 determines whether there is an operation corresponding to the unperformable-assistance. The operation corresponding to the unperformable-assistance represents a pre-defined driver's operation corresponding to the unperformable-assistance. For example, in cases where the function relating to steering is included in the unperformable-assistance, the operation corresponding to the unperformable-assistance may be a driver's steering operation. In cases where the function relating to acceleration/deceleration is included in the unperformable-assistance, the operation corresponding to the unperformable-assistance may be a driver's operation of the accelerator pedal or the brake pedal.

When the automated driving control ECU 10 determines in S240 that there is no operation corresponding to the unperformable-assistance, the processing proceeds to S250. In S250, the automated driving control ECU 10 determines whether the upper limit time set as the timer has elapsed.

When the automated driving control ECU 10 determines in S240 that there is an operation corresponding to the unperformable-assistance, the processing proceeds to S430.

When the automated driving control ECU 10 determines in S250 that the timer time has not elapsed, the processing returns to S240. When the automated driving control ECU 10 determines in S250 that the timer time has elapsed, the processing proceeds to S410. In S410, the automated driving control ECU 10 sets the vehicle travel mode to a vehicle stop mode, and ends the automated driving mode determination processing.

The vehicle stop mode refers to a mode in which the vehicle is caused to stop regardless of a driver's operation. While limiting the movement of the subject vehicle, this mode finally stops the vehicle. The limiting of the movement corresponds to, for example, restriction on movement into an overtaking lane, restriction on traveling speed, restriction on acceleration, and the like.

When the automated driving control ECU 10 determines in S220 that there is no unperformable-assistance, the processing proceeds to S420.

In S310, the automated driving control ECU 10 determines whether there is an unperformable-assistance.

Here, it is determined whether the function switched over to the manual driving is returnable to the automated driving. When the automated driving control ECU 10 determines in S310 that there is no unperformable-assistance, the processing proceeds to S420. In S420, the travel mode is set to the automated driving mode. Specifically, when a transition is made from the partial automated driving mode to the automated driving mode, the function determined to be returnable to the automated driving is returned to the automated driving.

When the automated driving control ECU 10 determines in S310 that there is an unperformable-assistance, the processing proceeds to S320. In S320, the automated driving control ECU 10 determines whether there is a change in unperformable-assistance. When the automated driving control ECU 10 determines in S320 that there is a change in the unperformable-assistance, the processing proceeds to S330. In S330, the timer is set. This process is substantially the same as the above-described S230.

In S340, the automated driving control ECU 10 determines whether there is an operation corresponding to the unperformable-assistance. This process is substantially the same as the above-described S240.

When the automated driving control ECU 10 determines in S340 that there is an operation corresponding to the unperformable-assistance, the processing proceeds to S430. In S430, the partially automated driving mode is set and then the processing returns to S110. When the automated driving control ECU 10 determines in S340 that there is no operation corresponding to the unperformable-assistance, the processing proceeds to S350. In S350, the automated driving control ECU 10 determines whether the upper limit time set as the timer time has elapsed.

When the automated driving control ECU 10 determines in S350 that the upper limit time has not elapsed, the processing returns to S340. When the automated driving control ECU 10 determines in S350 that the timer time has elapsed, the processing proceeds to S410.

When the automated driving control ECU 10 determines in S320 that there is no change in the unperformable-assistance, the processing proceeds to S430. In S430, the partially automated driving mode is set and then the processing returns to S110. The partially automated driving mode corresponds to processing in which the function set in S130 as the function to be performed in the automated driving is actually in operation.

(1-3. Example of Operation)

With regard to the above-described automated driving mode determination processing, an example will described.

Figure 6:
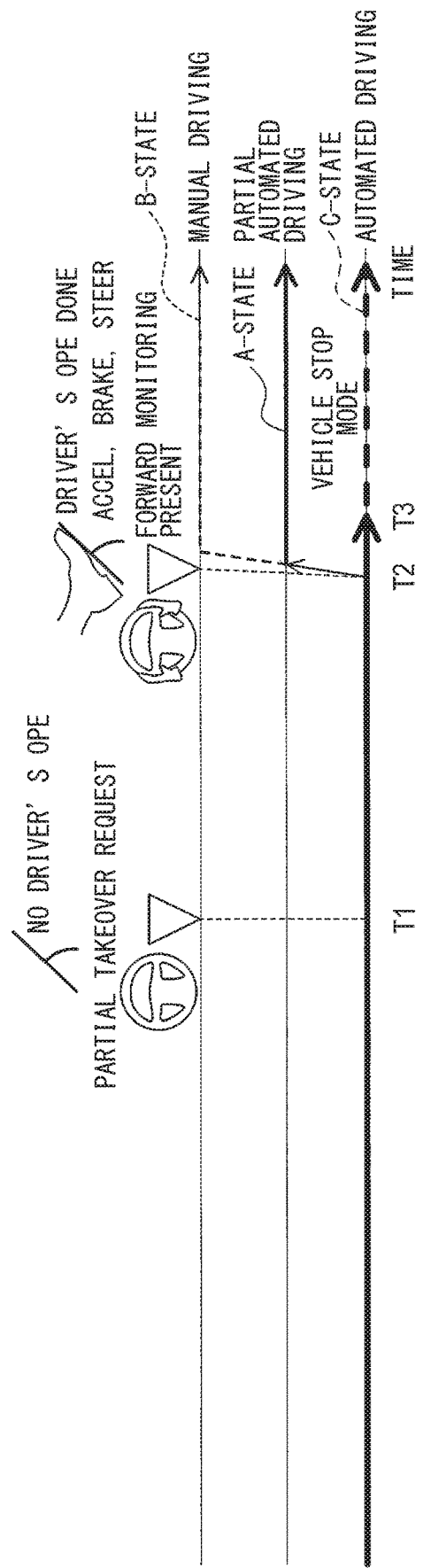

As shown in FIG. 6, suppose that in the automated driving mode, there is a takeover request (TOR) to switch over to the partially automated driving. In this case, when the driver performs the corresponding operation at T2 within the upper limit time, the transition to the A-state shown in FIG. 6 occurs. Specifically, the mode is switched over to the partially automated driving mode.

It is noted that the present embodiment differs from the related art in that the related art releases all of the functions of the automated driving and switches over to the manual driving shown as the B-state in FIG. 6. In the present embodiment, in cases where the control relating to the steering is switched over to the manual, the presence of the corresponding operation is determined in response to detection of the grip of the steering wheel. In cases where the control relating to the acceleration/deceleration is switched over to the manual, the presence of the corresponding operation is determined in response to the detection of the operation of the acceleration/brake pedal. In this regard, the corresponding operation may be suitably sets. For example, the presence of a corresponding operation may be determined in response to recognizing a light of sight of the driver and the light of sigh being directed toward the front of the subject vehicle.

When the corresponding operation is absent within the upper limit time, the automated driving control ECU 10 shifts the mode to the vehicle stop mode at time T3.

Figure 7:
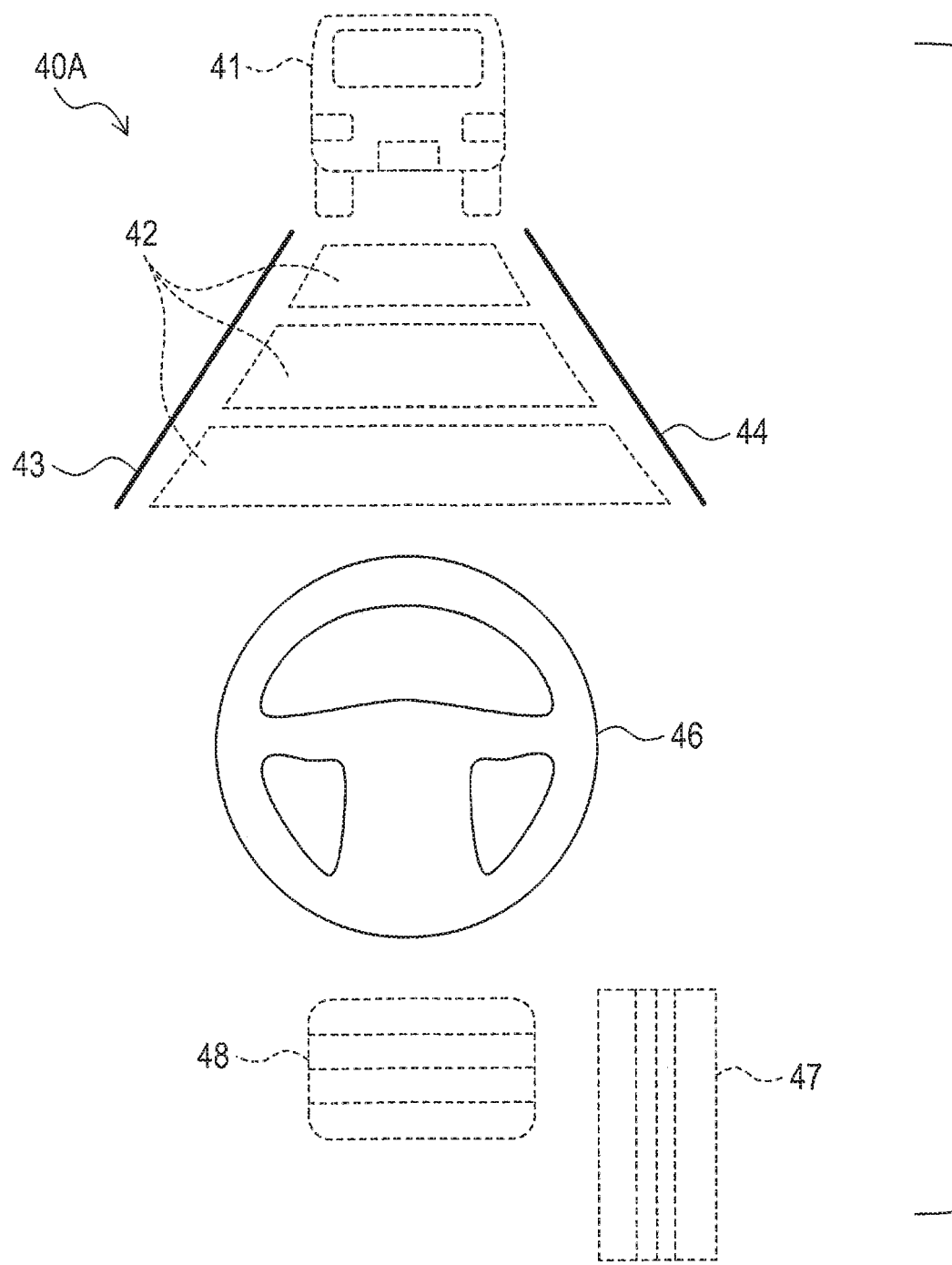
FIG. 7 is a diagram illustrating a status image displayed when acceleration/deceleration control is switched over to manual driving.
Figure 8:
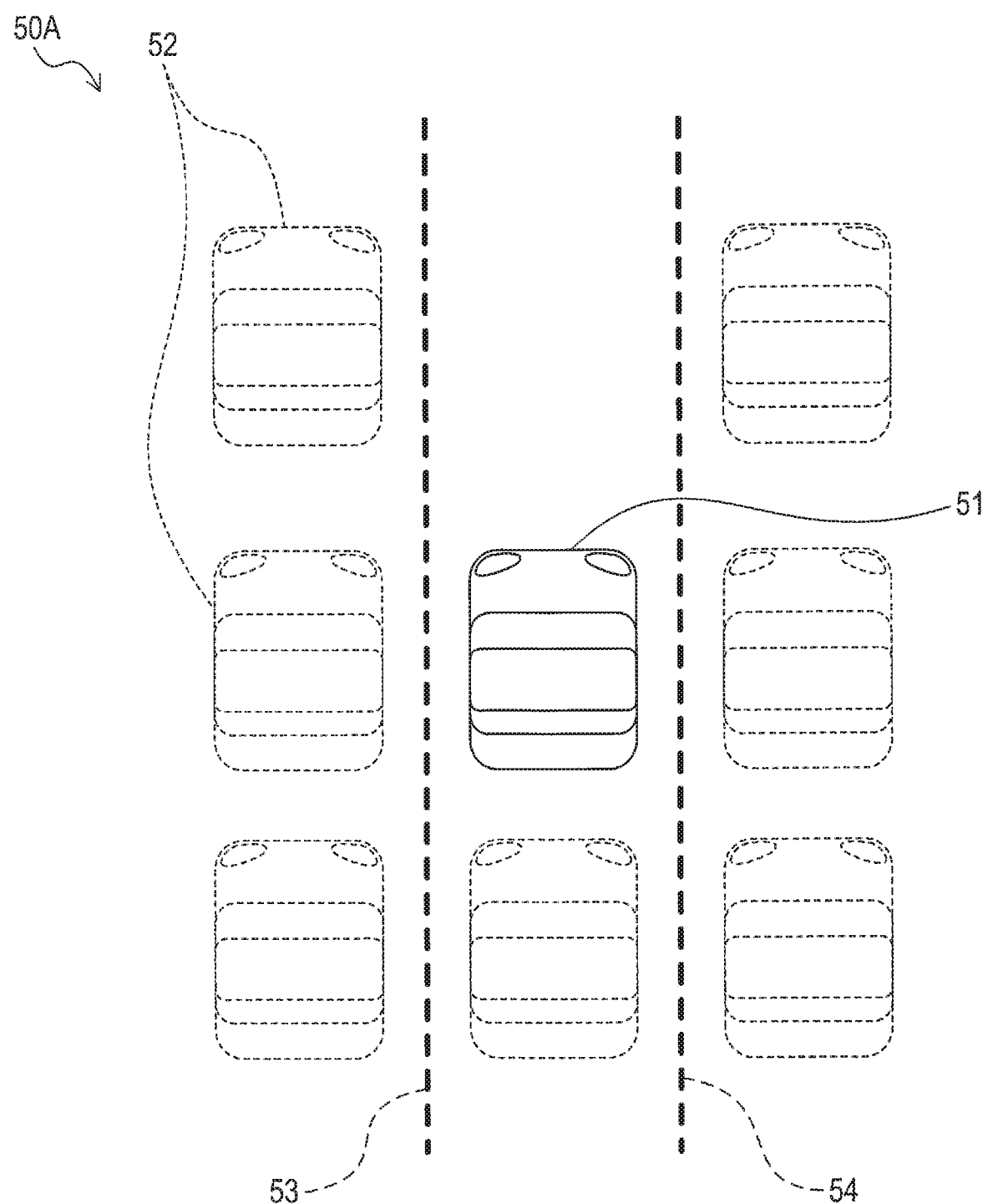
FIG. 8 is a diagram illustrating a vicinity detection image displayed when acceleration/deceleration control is switched over to manual driving.

If it is not possible to recognize an obstacle such as another vehicle, the automated driving control ECU 10 causes the display unit 301 to display, for example, a status image 40A as shown in FIG. 7 or a vicinity detection image 50A as shown in FIG. 8. In the status image 40A, as shown in FIG. 7, the preceding vehicle illustration 41 and the vehicle-to-vehicle illustration 42, which are the illustration relating to the obstacle unrecognizable, are lighted off. Further, the left white line illustration 43 and the right white line illustration 44, which are the illustrations relating to the white lines recognized, are lighted up. In the status image 40A, the steering illustration 46, which relates to the steering function of the automated driving determined as to be maintained, is lighted off. The accelerator pedal illustration 47 and the brake pedal illustration 48, which relate to the acceleration and deceleration switched to the manual, are lighted off.

In the vicinity detection image 50A, as shown in FIG. 8, the preceding vehicle in the other vehicle illustrations 52 is lighted off. When a vehicle other than the preceding vehicle is recognized, the corresponding vehicle illustration 52 is lighted up. In the vicinity detection image 50A, the left white line illustration 53 and the right white line illustration 54 are lighted up.

Figure 9:
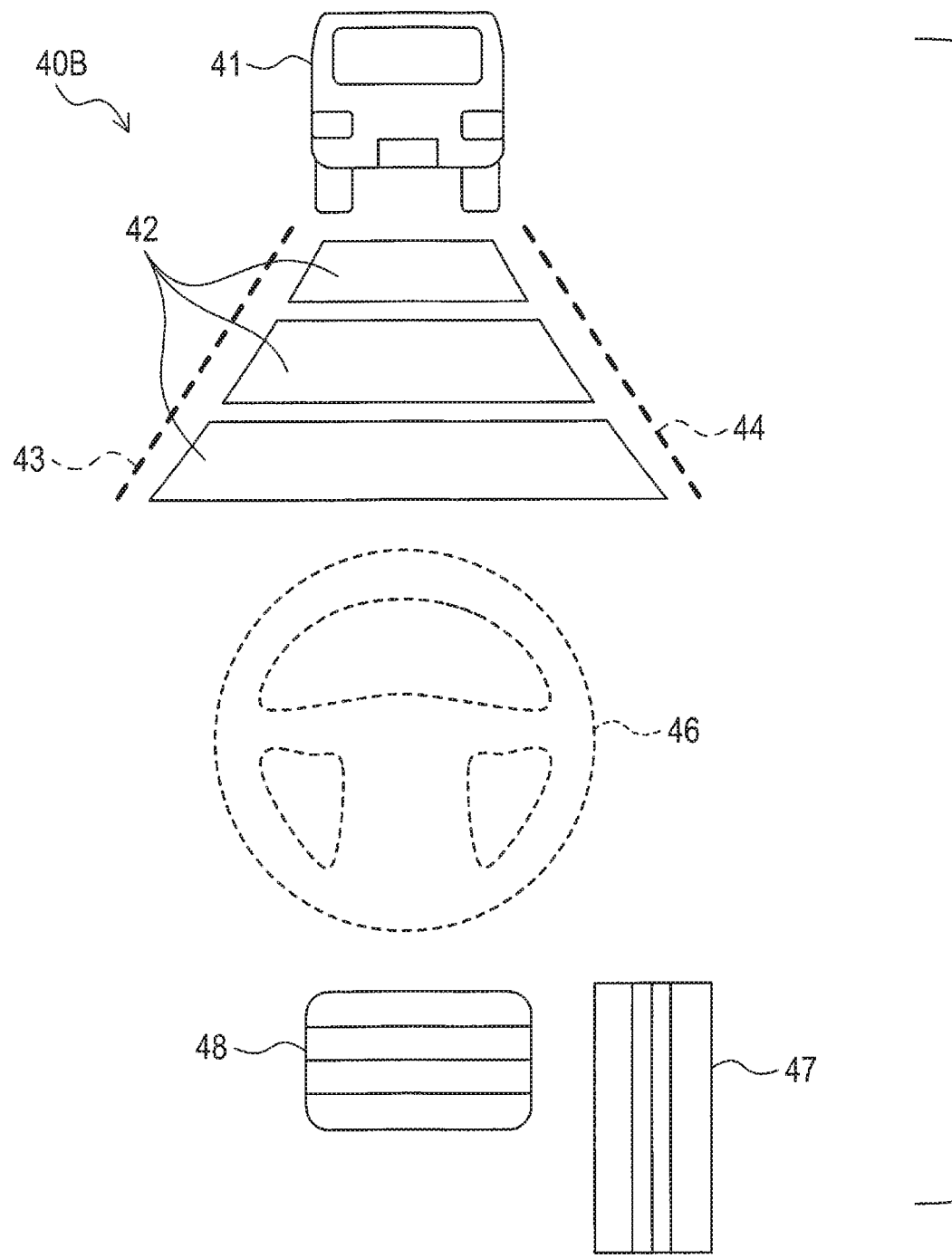
FIG. 9 is a diagram illustrating a status image displayed when steering control is switched over to manual driving.
Figure 10:
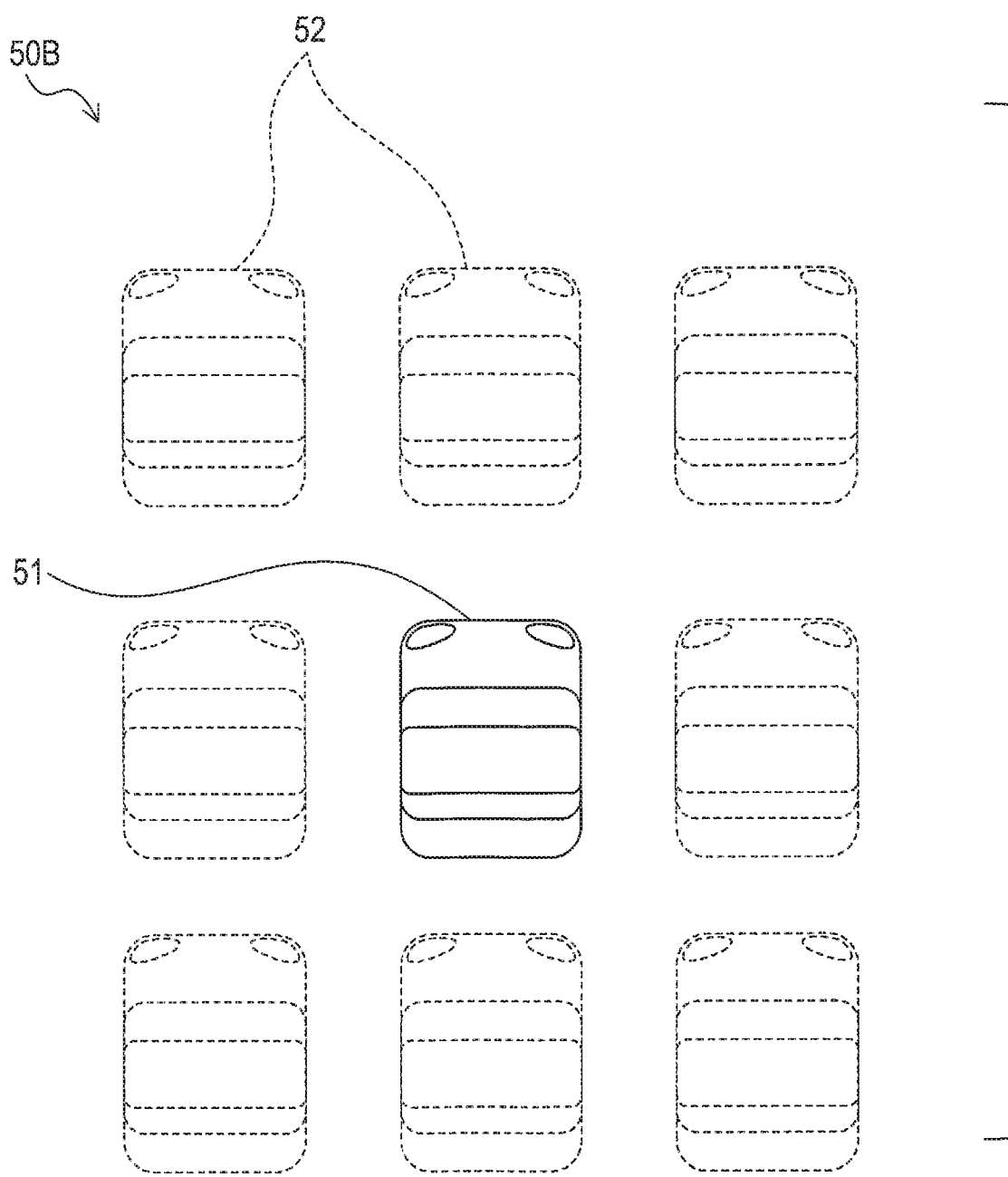
FIG. 10 is a diagram illustrating a vicinity detection image displayed when steering control is switched over to manual driving.

When the lane on which the subject vehicle travels is unrecognizable, the automated driving control ECU 10 causes the display unit 301 to display, for example, a status image 40B as shown in FIG. 9 or a vicinity detection image 50B as shown in FIG. 10. In the status image 40B, as shown in FIG. 9, the preceding vehicle illustration 41 and the vehicle-to-vehicle illustration 42, which are the illustrations relating to the obstacle recognized, are lighted up. The left white line illustration 43 and the right white line illustration 44, which are the illustration relating to the white lines unrecognized, are lighted off. In the status image 40B, the steering illustration 46 relating to the steering function to be switched to the manual driving is lighted off. The accelerator pedal illustration 47 and the brake pedal illustration 48, which relate to the acceleration and deceleration maintained at the automated driving, are lighted up.

In the vicinity detection image 50B, the other vehicle illustration 52 is lighted up as shown in FIG. 10. In the vicinity detection image 50B, the left white line illustration 53 and the right white line illustration 54 are lighted off.

Figure 11:
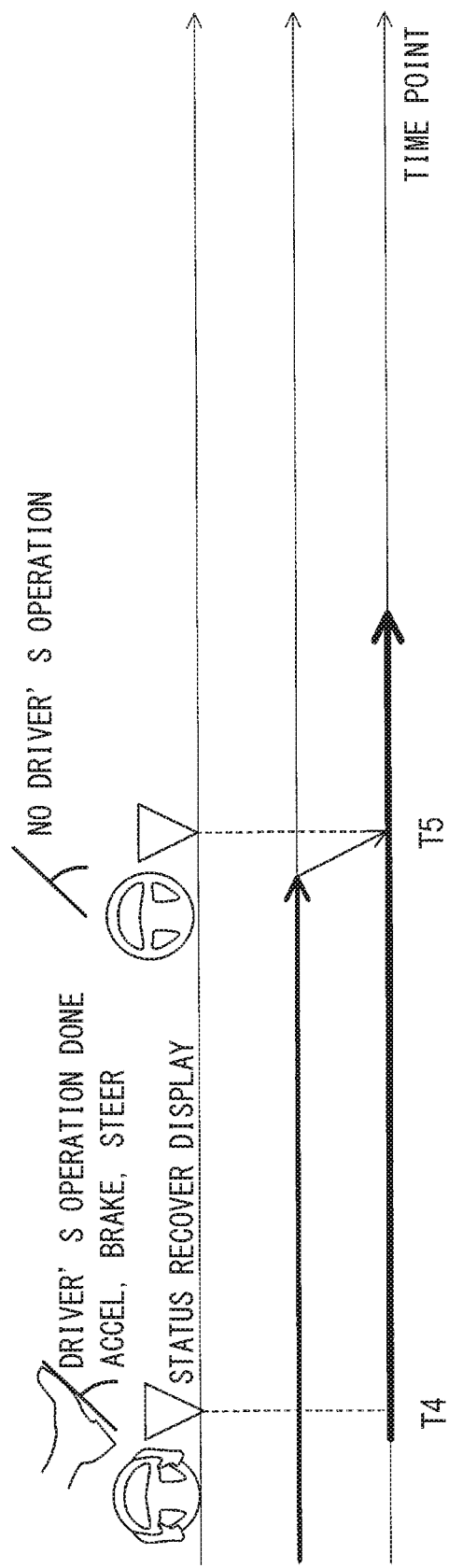
FIG. 11 is a timing chart illustrating a case where partially automated driving is returned to automated driving.

Next, the returning from the partially automated driving mode to the automated driving mode will be described with reference to FIG. 11. As shown in FIG. 11, suppose that at time T4, there is the return from the partially automated driving mode to the automated driving mode. In this case, when the driver's operation is performed, the automated driving control ECU 10 gives priority to the driver's operation and sets a control amount based on the driver's operation.

Figure 12:
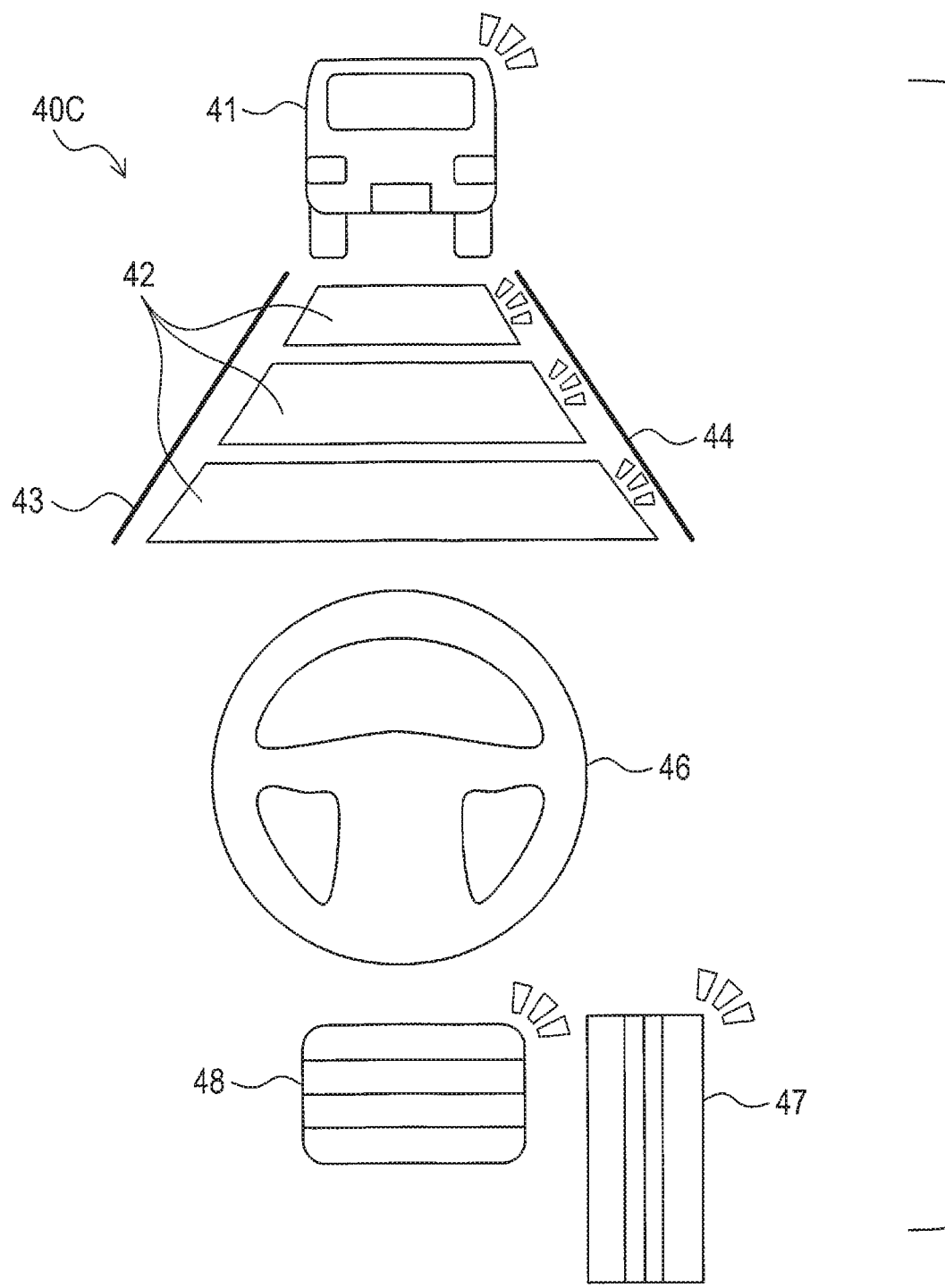
FIG. 12 is a diagram illustrating a status image displayed when acceleration/deceleration control is returned to automated driving.
Figure 13:
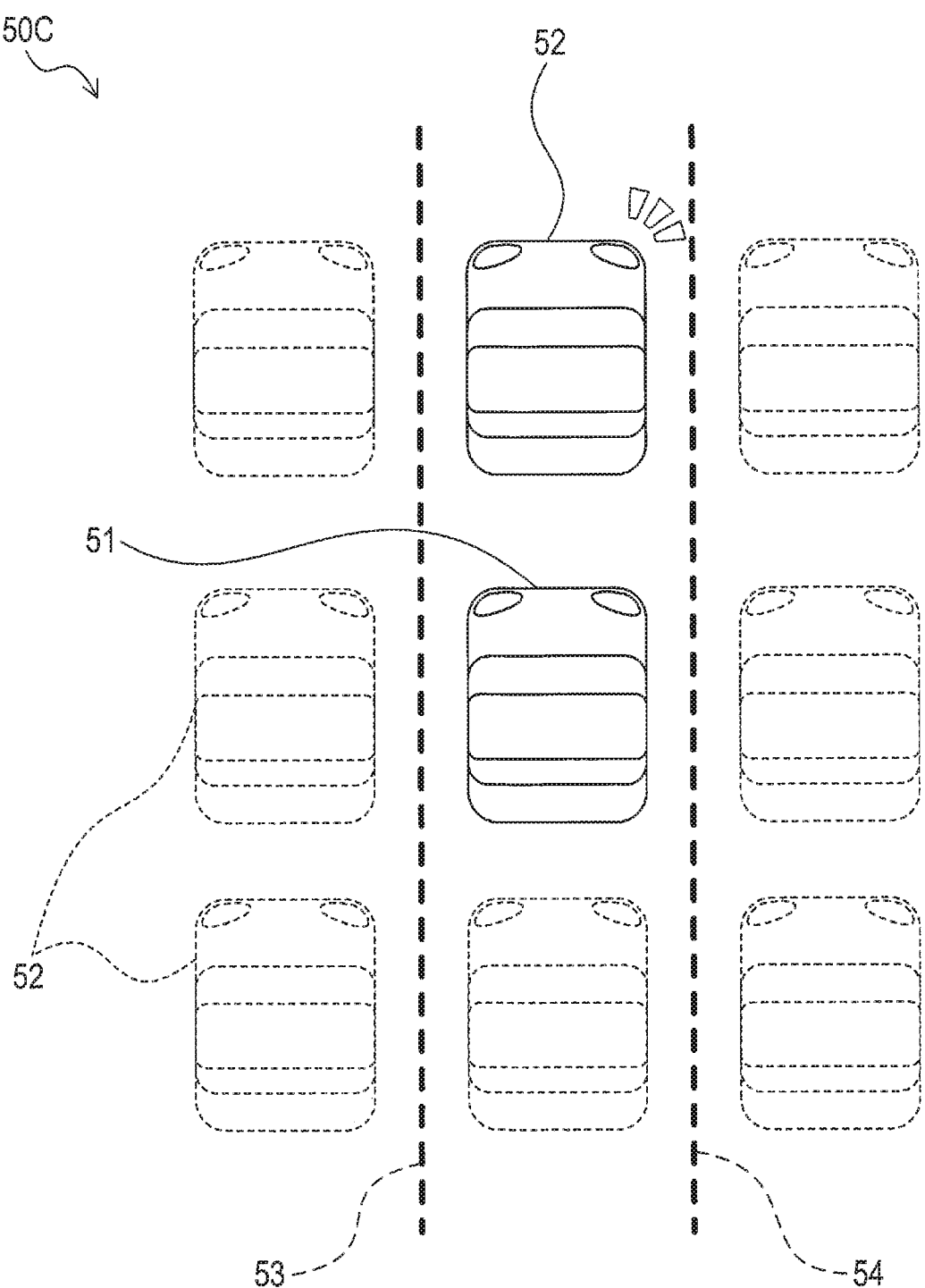
FIG. 13 is a diagram illustrating a vicinity detection image displayed when acceleration/deceleration control is returned to automated driving.

Like this, when the automated driving control ECU 10 returns the function relating to the acceleration/deceleration to the automated driving, the automated driving control ECU 10 causes the display unit 301 to display, for example, a status image 40C as shown in FIG. 12 or a vicinity detection image 50C as shown in FIG. 13. In the status image 40C, as shown in FIG. 12, the preceding vehicle illustration 41 and the vehicle-to-vehicle illustration 42, which are the illustrations relating to the obstacle that becomes recognizable, are blinked. The left white line illustration 43 and the right white line illustration 44, which relate to the white lines that have been recognizable so far, are lighted up.

Further, in the status image 40C, the steering illustration 46, which relates to the steering function having been performed for the automated driving so far, is lighted up. The accelerator pedal illustration 47 and the brake pedal illustration 48, which relates to the acceleration and deceleration having returned to the automated driving, are blinked.

In the vicinity detection image 50C, the other vehicle illustration 52 is lighted up as shown in FIG. 13. In the vicinity detection image 50B, the left white line illustration 53 and the right white line illustration 54 are lighted off.

Figure 14:
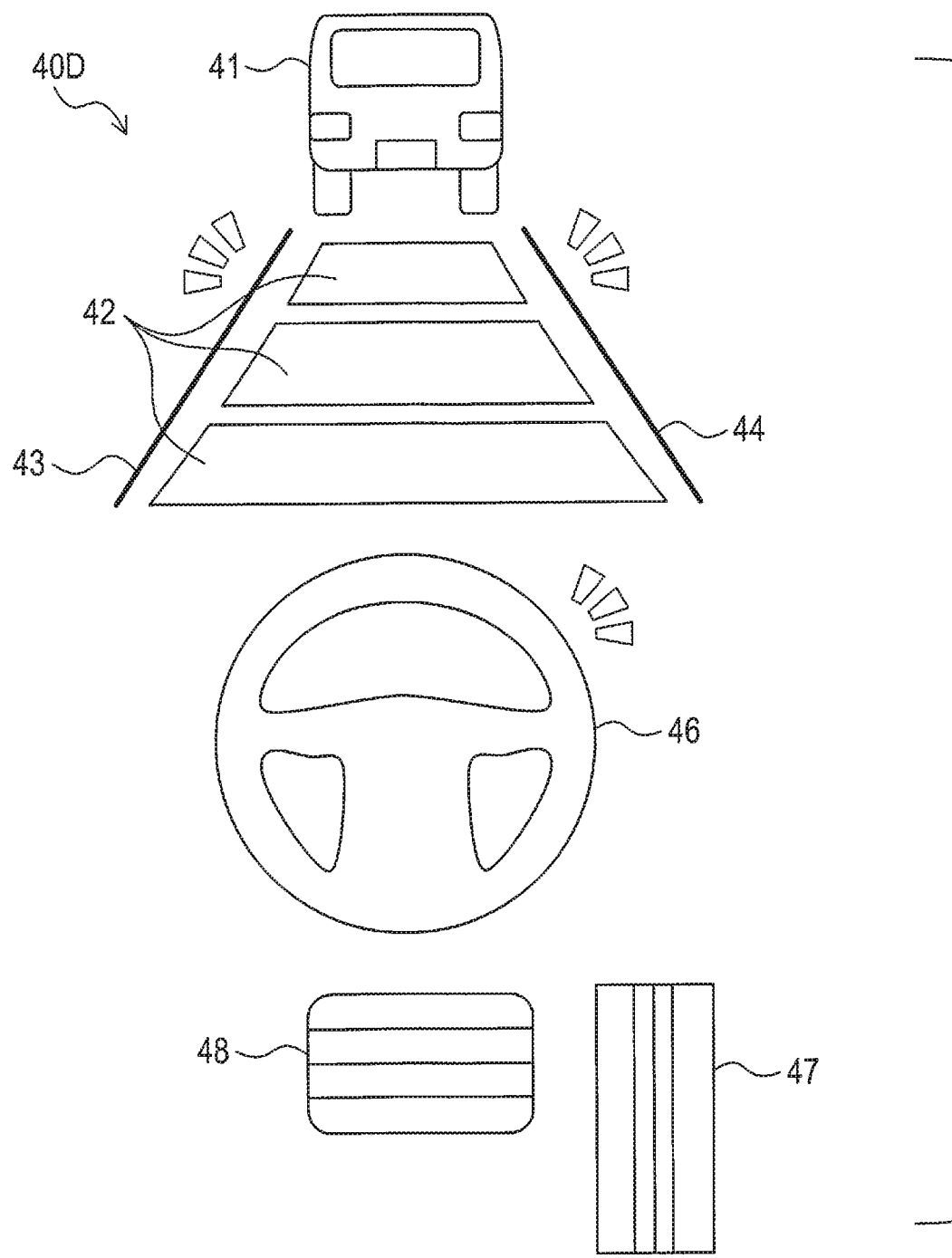
FIG. 14 is a diagram illustrating a status image displayed when steering control is returned to automated driving.
Figure 15:
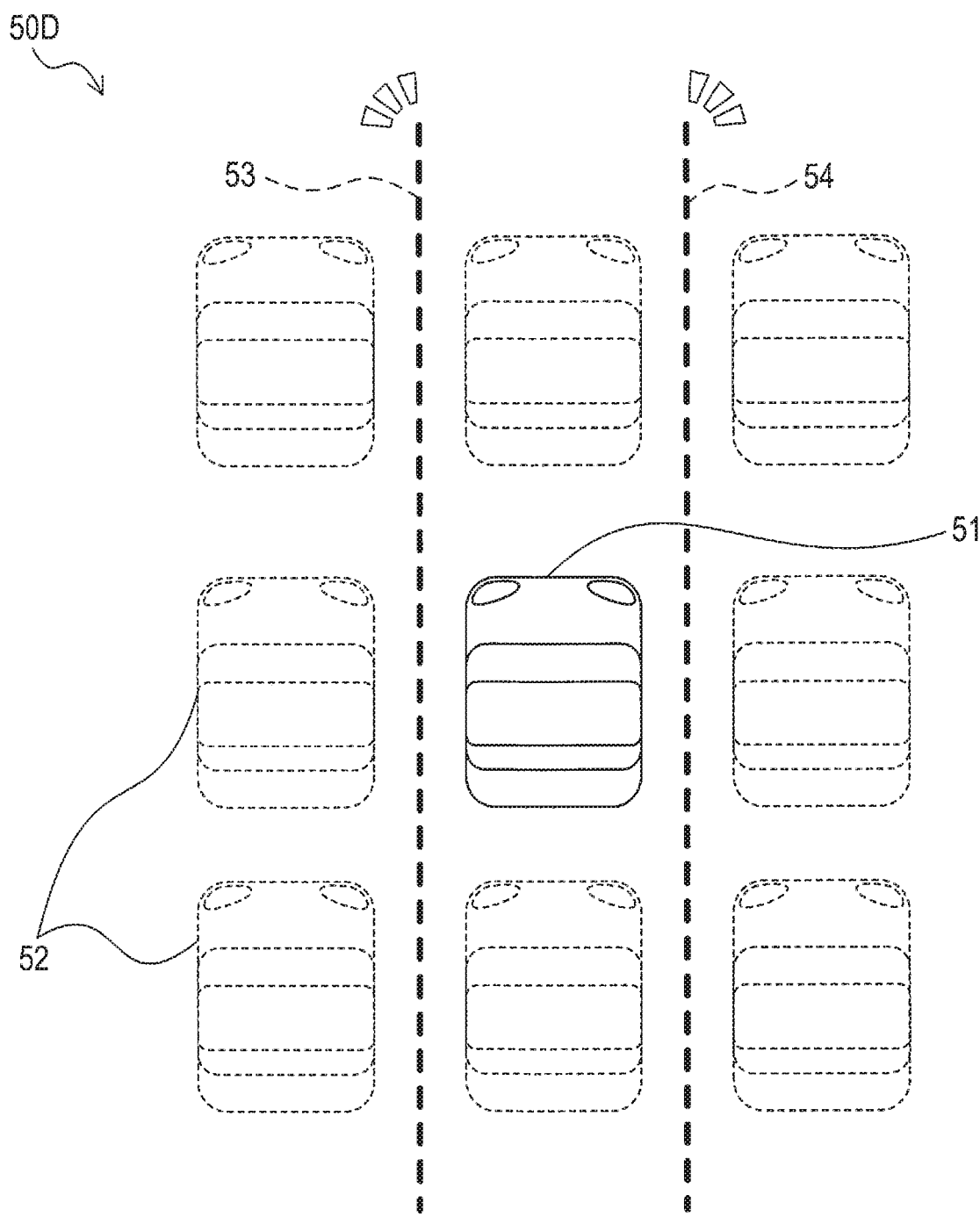
FIG. 15 is a diagram illustrating a vicinity detection image displayed when steering control is returned to automated driving.

In cases where the automated driving control ECU 10 returns the function relating to the steering to the automated driving, the automated driving control ECU 10 causes the display unit 301 to display, for example, a status image 40D as shown in FIG. 14 or a vicinity detection image 50D as shown in FIG. 15. In the status image 40D, as shown in FIG. 13, the preceding vehicle illustration 41 and the vehicle-to-vehicle illustration 42, which are the illustrations relating to the obstacle that has been recognized so far, are lighted up. The left white line illustration 43 and the right white line illustration 44, which relate to the lane that becomes recognizable, are blinked.

Further, in the status image 40D, the steering illustration 46, which relates to the steering function having returned to the automated driving, is blinked. The accelerator pedal illustration 47 and the brake pedal illustration 48, which relate to the acceleration and deceleration having been performed for the automated driving, are lighted up. In the vicinity detection image 50D, as shown in FIG. 15, the other vehicle illustration 52 is blinked. In the vicinity detection image 50D, the left white line illustration 53 and the right white line illustration 54 are lighted up.

At the time T5 shown in FIG. 11, there is no driver's operation. In this case, the automated driving control ECU 10 controls the subject vehicle in the automated driving mode. At this time, the automated driving control ECU 10 changes the blinking of each illustration into the lighting up, and causes the display unit 301 to display the status image 40 or the vicinity detection image 50 shown in FIGS. 3 and 4.

(1-4. Technical Effect)

The embodiment described in detail above provides the following technical effect.

(1a) The automated driving system 1A includes the automated driving control ECU 10. The automated driving control ECU 10 includes the automated driving control unit 13 and the mode determination unit 16. The automated driving control unit 13 is configured to set control contents for a plurality of functions for automatically driving the vehicle, and to control the vehicle according to the control contents.

One or more items of vehicle vicinity information are associated in advance with each of the plurality of functions. The mode determination unit 16 determines, for each of the polarity of functions, whether it is possible to recognize the associated one or more items of the vehicle vicinity information.

The mode determination unit 16 causes the automated driving control unit 13 to maintain (i) the automated driving that uses a function associated with one or more recognized items of the vehicle vicinity information among the plurality of functions, and (i) switch over, into the manual driving, a function associated with one or more unrecognized items of the vehicle vicinity information among the plurality of functions.

With this configuration, one or more items of the vehicle vicinity information is associated with each of the plurality of functions for automated driving, and it is possible to change only a function of the automated driving associated with the unrecognizable item of the vehicle vicinity information into the manual driving. It is therefore possible to main the automated driving function as much as possible.

(1b) In the automated driving system 1A, the mode determination unit 16 is configured to determine whether the function switched over to the manual driving is returnable to the automated driving. The automated driving system 1A returns the function determined to be returnable to the automated driving to the automated driving.

With this configuration, the function switched over to the manual driving can be returned to the automated driving.

(1c) In the automated driving system 1A described above, the mode determination unit 16 is configured to notify the driver of the vehicle about the function that is going to return or has returned to the automated driving.

With this configuration, in cases where the function switched over to the manual driving is restored to the automated driving, the restored function is notified to the driver, and therefore, it is possible for driver to recognize what function is restored to the automated driving.

(1d) In the automated driving system 1A, the automated driving control unit 13 has at least a function of steering the vehicle included in the plurality of functions for the automated driving of the vehicle. The mode determination unit 16 determines whether at least a line in which the vehicle travels is recognizable as one or items of the vehicle vicinity information associated with the function of steering the vehicle. When the lane in which the vehicle travels is unrecognizable, the automated driving system 1A switches over the function of steering the vehicle from the automated driving to the manual driving.

With this configuration, in cases where the lane in which the vehicle travels is recognizable, it is possible to switch over the function of steering the vehicle from the automated driving to the manual driving, and it is possible to maintain other functions at the automated driving.

(1e) In the automated driving system 1A described above, the automated driving control unit 13 includes at least a function of accelerating and/or decelerating the vehicle included in the plurality of functions for the automated driving of the vehicle. The mode determination unit 16 determines whether at least an obstacle located in the vicinity of the vehicle is recognizable as one or more items of the vehicle vicinity information associated with the function of accelerating and/or decelerating the vehicle. When the obstacle located in the vicinity of the vehicle is unrecognizable, the automated driving system 1A switches over the function of accelerating and decelerating from the automated driving to the manual driving.

With this configuration, in cases where an obstacle located in the vicinity of the vehicle is unrecognizable, it is possible to switch over the function of accelerating and/or decelerating the vehicle from the automated driving to the manual driving and it is possible to maintain other functions at the automated driving.

(1f) In the automated driving system 1A described above, the mode determination unit 16 determines whether a driver's operation associated in advance with the function switched over to the manual driving has been performed. When the driver's operation is absent a predetermined operation reception time, the automated driving system 1A limits the movement of the vehicle.

With this configuration, in cases where the operation associated with the function switched over to the manual driving is not performed by the driver, the movement of the vehicle is limited, and therefore, it is possible to safely control the vehicle even in case that the driver is incapable of performing the driving operation.

(1g) In the automated driving system 1A described above, the mode determination unit 16 is configured to set the operation reception time according to the environment in the vicinity of the vehicle.

With this configuration, the operation reception time, which is an allowable time of waiting for the driver's operation corresponding to the function switched over to the manual driving, is set according to the environment in the vicinity of the vehicle. Therefore, it is possible to appropriately set the operation reception time in such a manner that, for example, as the environment is safer, the operation reception time is longer.

2. Other Embodiments

Although embodiments of the present disclosure have been illustrated above, embodiments of the present disclosure are not limited to the above embodiments, and various modifications are implementable.

(2a) In the above embodiment, the control relating to the acceleration and/or deceleration is simultaneously switched over to the partially automated driving and returned to the automated driving but the present disclosure is not limited to this. For example, only control related to acceleration or control relating to deceleration may be switched to the partially automated driving, and/or may be returned to the automated driving.

(2b) A plurality of functions of one component in the above embodiment may be realized by a plurality of components. One function of one component may be realized by a plurality of components. A plurality of functions of a plurality of components may be realized by one component. One function realized by a plurality of components may be realized by one component. Part of the configuration of the above embodiment may be omitted. At least part of the configuration of the above-described embodiment may be added to or replaced with the configuration of another above-described embodiment.

(2c) In addition to the above-described automated driving system 1A, technical ideas of the present disclosure may be embodied in various forms, including a device that is a component of the automated driving system 1A, a program causing a computer to function as the automated driving system 1A, a non-transitory tangible storage medium storing the program such as a semiconductor memory, a method of switching over to partially automated driving, and the like.

In the above embodiments, the automated driving control ECU 10 and the automated driving control unit 13 correspond to a vehicle control device and a driving control unit, respectively. The CPU 11 corresponds to a processing device. Further, the automated driving control ECU 10 serving as the mode determination unit 16 performing S130 corresponds to a recognition determination unit and the automated driving control ECU 10 serving as the mode determination unit 16 performing S150 corresponds to a return notification unit.

The automated driving control ECU 10 performing S230 and S330 corresponds to a time setting unit. The automated driving control ECU 10 performing S250, S350 and S410 corresponds to a movement limiting unit.

The automated driving control ECU 10 performing S310 corresponds to a return determination unit. The automated driving control ECU 10 performing S420 corresponds to an automatic return unit. The automated driving control ECU 10 performing S430 corresponds to a to-manual switchover unit.

What is claimed is:

1. A vehicle control device mounted to a vehicle and configured to control a traveling state of the vehicle, comprising a processor, the processor configured to:
   set control contents for a plurality of functions for automated driving of the vehicle, respectively, and control the vehicle according to the control contents, wherein the plurality of functions are each associated with one or more items of vehicle vicinity information;
   determine, for each of the plurality of functions, whether it is possible to recognize the associated one or more items of the vehicle vicinity information;
   switch each control mode of the each of the plurality of functions between (i) an automated control mode that does not require a manual operation by a driver of the vehicle and (ii) a manual control mode that requires the manual operation by the driver; and
   control the vehicle in a partially automated driving mode that includes controlling a first function of the plurality of functions in the automated control mode while controlling a second function of the plurality of functions in the manual control mode, the first function being associated with the one or more items of the vehicle vicinity information that are determined to be recognizable and the second function being associated with the one or more items of the vehicle vicinity information that are determined to be unrecognizable.

2. The vehicle control device according to claim 1, wherein the processor is further configured to:
   determine whether the control mode of the second function controlled in the manual control mode can be switched to the automated control mode; and
   control the second function in the automated control mode when it is determined that the control mode of the second function can be switched to the automated control mode.

3. The vehicle control device according to claim 2, wherein
   the processor is further configured to:
   notify the driver of the vehicle about the second function whose control mode is going to be switched or has been switched to the automated control mode.

4. The vehicle control device according to claim 1, wherein
   the plurality of functions include a function of steering the vehicle, and
   the processor is further configured to:
   determine whether at least a lane in which the vehicle travels is recognizable as one or more items of the vehicle vicinity information associated with the function of steering the vehicle; and
   switch the control mode of the function of steering the vehicle from the automated control mode to the manual control mode when it is determined that the lane in which the vehicle travels is unrecognizable.

5. The vehicle control device according to claim 1, wherein
   the plurality of functions include a function of accelerating and/or decelerating the vehicle, and
   the processor is further configured to:
   determine whether at least an obstacle located in a vicinity of the vehicle is recognizable as one or more items of the vehicle vicinity information associated with the function of accelerating and/or decelerating the vehicle; and
   switch the control mode of the function of accelerating and/or decelerating the vehicle from the automated control mode to the manual control mode when it is determined that the obstacle located in the vicinity of the vehicle is unrecognizable.

6. The vehicle control device according to claim 5, wherein:
   when a reflected wave from a road surface is unobtainable by a reflected wave sensor for obstacle detection or an image itself is unobtainable from a camera for imaging the vicinity of the vehicle, the processor determines that the obstacle is unrecognizable.

7. The vehicle control device according to claim 1, wherein
   the processor is further configured to:
   determine whether a driver's operation associated in advance with the function whose control mode has been switched to the manual control mode has been performed; and
   limit movement of the vehicle when the driver's operation is absent within a preset operation reception time.

8. The vehicle control device according to claim 7, wherein
   the processor is further configured to:
   set the operation reception time based on a danger level of an environment in a vicinity of the vehicle.

9. A vehicle control device mounted to a vehicle, comprising:
- a memory storing a program for controlling a traveling state of the vehicle; and
- a processing device communicably connected to the memory, for reading and executing the program, wherein:

according to the program, the processing device:

sets control contents for a plurality of functions for automated driving of the vehicle, respectively, and controls the vehicle according to the control contents, wherein the plurality of functions are each associated with one or more items of vehicle vicinity information;

determines, for each of the plurality of functions, whether it is possible to recognize the associated one or more items of the vehicle vicinity information;

controls the vehicle in a partially automated driving mode that includes controlling a first function of the plurality of functions in an automated control mode that does not require a manual operation by a driver while controlling a second function of the plurality of functions in a manual control mode that requires the manual operation by the driver, the first function being associated with the one or more items of the vehicle vicinity information that are determined to be recognizable and the second function being associated with the one or more items of the vehicle vicinity information that are determined to be unrecognizable.

10. A method for controlling automated driving of a subject vehicle, comprising:

setting control contents for a plurality of functions for the automated driving of the subject vehicle, and controlling the subject vehicle according to the control contents, acquiring vehicle vicinity information indicating a situation in a vicinity of the subject vehicle, including statuses of recognition of another vehicle, a white line and a lane, wherein the plurality of functions for the automated driving of the subject vehicle are each associated with one or more items of the vehicle vicinity information;

determining, for each of the plurality of functions, whether it is possible to recognize the associated one or more items of the vehicle vicinity information; and controlling a first function of the plurality of functions in an automated control mode that does not require a manual operation by a driver while controlling a second function of the plurality of functions in a manual control mode that requires the manual operation by the driver, the first function being associated with the one or more items of the vehicle vicinity information that are determined to be recognizable and the second function being associated with the one or more items of the vehicle vicinity information that are determined to be unrecognizable.

\* \* \* \* \*